UNITED STATES PATENT OFFICE.

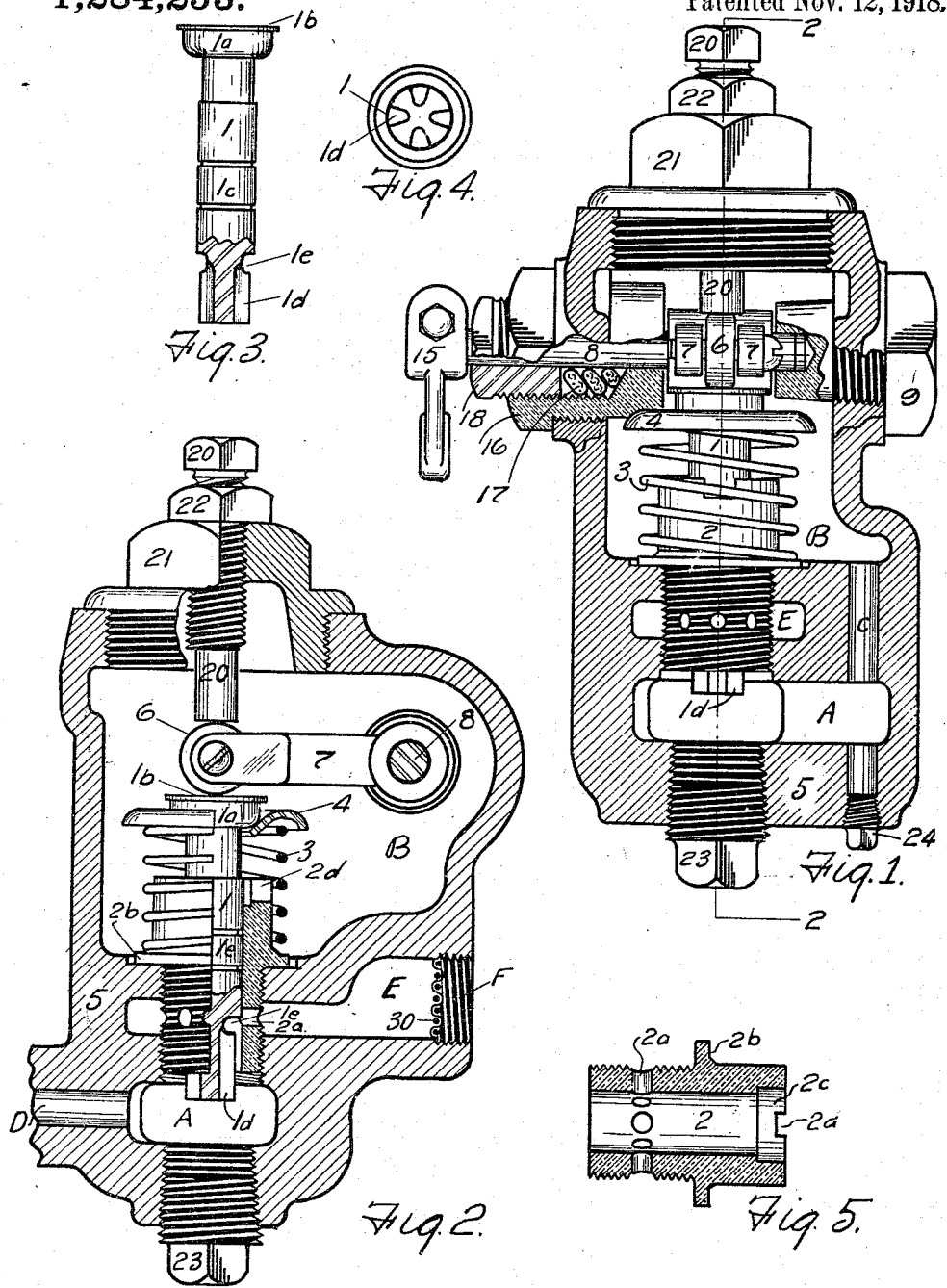

LEWIS A. DARLING, OF ANDERSON, INDIANA, ASSIGNOR TO ELECTRIC SERVICE SUPPLIES COMPANY, OF PHILADELPHIA, PENNSYLVANIA, A CORPORATION OF PENNSYLVANIA.

VALVE.

1,284,253.     Specification of Letters Patent.     Patented Nov. 12, 1918.

Application filed October 10, 1914. Serial No. 865,995.

*To all whom it may concern:*

Be it known that I, LEWIS A. DARLING, a citizen of the United States, residing at Anderson, in the county of Madison and State of Indiana, have invented a new and useful Improvement in Valves, of which the following is a specification.

The objects of my invention are to produce an extremely simple and efficient valve, which is inexpensive to manufacture and which permits of easy and quick renewal of any or all of its parts. A peculiar feature of its efficiency is due to the fact that not only is the valve member properly balanced with relation to the pressure, but its actuating devices are of such character and are so disposed that their movement is substantially neutral with relation to any differential pressure existing within the valve or in any of its chambers or passages.

The preferred form of my invention is shown in the accompanying drawings, wherein:

Figures 1 and 2 show the mechanism of the valve, Fig. 2 being a partial sectional view along the line 2—2 of Fig. 1 and at right angles to the section plane of Fig. 1. In these views the casing is shown in section in order to expose the interior, and certain other parts are also shown partially or wholly in section.

Fig. 3 is a side view of the valve plunger and Fig. 4 a bottom view thereof.

Fig. 5 is a section of the sleeve in which said plunger slides.

There is a plunger 1 adapted to slide in a sleeve 2, said sleeve being rigidly supported in a cylindrical opening formed in a casing 5, preferably by being screwed therein. The upper end of said plunger has an enlarged head $1^a$, and a rim $1^b$. Said rim is to enable the plunger to be grasped by a suitable tool for the purpose of removing said plunger. In the larger forms of valves the plunger may be grasped with the fingers, if preferred. Beneath said enlarged head is a substantially cylindrical portion $1^c$, terminating at its lower end in a fluted portion $1^d$. The object of this fluting is to provide a duct or ducts without entirely cutting away the guiding surface on the lower end of the plunger. There is an annular groove $1^e$ at the top of the fluted portion, which is adapted to register more or less completely, according to the position of said plunger, with a plurality of ports $2^a$ extending radially through the sleeve 2.

The plunger 1 is forced upwardly by the compression spring 3, whose lower end abuts some stationary part of the valve, and whose upper end abuts a washer 4, which washer in turn abuts the enlarged head $1^a$ of said plunger. The shape of the surfaces of said enlarged head and said washer is such that said washer may tilt slightly with reference to said head. By this means any inequalities which may be present in said spring or the surface against which its lower portion abuts simply tilt the washer with reference to the plunger, without cramping said plunger 1 in said sleeve 2. The lower surface of said washer 4 is adapted to receive the upper portion of said spring and prevent excessive lateral movement thereof. While the washer 4 is not absolutely necessary, it is an advantage in that it prevents the spring from producing excessive friction between the plunger 1 and sleeve 2.

The sleeve 2 possesses a rim or shoulder $2^b$ for the purpose of fixing the distance that said sleeve is screwed into said casing 5. At the upper end it has a counterbore $2^c$, and slots $2^d$. The slots are for the purpose of screwing or unscrewing said sleeve, and the counterbore is so that any burs that may be formed by the tool used in screwing and unscrewing said sleeve will not interfere with the motion of the plunger 1.

Downward motion is directly imparted to the plunger 1, against the pressure of the spring 3, by means of a lever 7 provided with a friction roller 6, at its bearing end, said lever 7 being rigidly secured at its opposite end to a transverse shaft 8. If the roller 6 were absent and the lever 7 acted directly on the plunger 1, the friction between said lever 7 and plunger 1 would tend to produce a lateral motion of said plunger and thereby increase the friction between said plunger 1 and said sleeve 2.

One end of the shaft 8 is supported in a bearing 9, said bearing preferably being a separate part from the casing 5 to provide economical means of renewal. It is, however, rigidly secured to the casing 5, preferably by being screwed therein. Secured to the other end of the shaft 8 is a lever 15, to which any suitable connection may be made, if desired, for operating the shaft 8 and thereby controlling the position of the plunger 1. The lever 15 is outside of the casing 5. Between said lever 15 and said lever 7 is a stuffing box having a body 16, packing material 17 and gland 18.

To limit the upward motion of the roller 6 and thereby the plunger 1, there is a stop 20 provided. This stop is here shown as adjustable with reference to the casing 5, being preferably in the form of a screw, fitting into a cap 21, and secured there by lock nut 22. The hole provided in the casing 5 for the cap 21 is large enough to permit the passage of plunger 1, sleeve 2, spring 3, washer 4 and lever 7, these parts being introduced through this hole during the process of assembling. Although the stop 20 is here shown as adjustable, this is not necessarily the case, since a suitable top properly located with reference to the casing 5 is all that is required to limit the upward motion of the roller 6 and thereby the plunger 1. It is, however, found to be advantageous to be able to adjust the upward limit of the plunger 1, and thereby the maximum opening of the valve.

There are shown plugs 23 and 24 which are introduced principally because it is more convenient to make the casing 5 with holes at these points.

There is a chamber A in the lower portion of the casing 5 which is in direct communication with a chamber B in the upper part of said casing through the medium of the permanent passageway C. There is an opening or passageway D communicating with the chamber A, and serving either as inlet or outlet, according to the particular manner in which the valve is employed. Said chambers A and B, passageway C and opening D together constitute the mechanism chamber, throughout which the pressure is equal.

There is a chamber or passageway E surrounding that portion of the sleeve 2 which contains the ports $2^a$. There is an opening F serving as either inlet or outlet, according to the particular use made of the valve, and communicating with said chamber E through a screen 30. Said screen is not an essential part of the invention, but is here introduced to prevent the passage of dirt or the like.

Communication between the mechanism chamber and the said chamber E is made through the ports $2^a$ in the sleeve 2, and the plunger 1, by its position in the sleeve 2, controls the communication between said chambers.

The manufacture of the various parts of the valve is extremely simple. The plunger 1 and sleeve 2 can be produced by turning, with the addition of a few minor operations. In the casing 5 many of the holes which are machined have a common axis. The other parts are obviously simple.

Since both ends of the plunger 1 are in communicating inclosures, there is no tendency for the pressure to move this plunger in either direction, and therefore the valve itself is a balanced member.

Owing to the fact that the member of the actuating mechanism which projects from within the casing through the wall of the casing to the outside of said casing, is so arranged or disposed that its actuating movement is not influenced so as to cause or tend to cause a change of its position by any differential pressure existing within the casing, said actuating mechanism itself is a substantially balanced group. Thus, in the embodiment shown, the movement of said projecting member is rotative, upon an axis at right angles to the direction of movement of the valve plunger, and hence the movement of the external member which causes or permits the shifting of the valve is only opposed by the frictional resistance to rotation, which may be regarded as substantially constant.

In the foregoing description and the accompanying drawings the valve has been described and shown as having certain parts uppermost. This has been done solely for convenience of description, as the valve may be used with any desired part uppermost. It will be clear that many details of construction may be varied without departing from the spirit of my invention and scope of the accompanying claims.

I claim as my invention:

1. The combination of, a plunger valve whose extremities present substantially similar effective pressure areas, said plunger valve being provided with a longitudinal duct at the region of one extremity; a casing having an opening adapted to receive said plunger and permit longitudinal movement thereof, said casing comprising a chamber at one extremity of said opening and a passage-way at the other extremity of said opening, said chamber and said passage-way communicating independently of said opening, but completely inclosing the respective extremities of the valve; said casing also comprising a second passageway communicating by a port with said opening at a region adapted to be controlled by longitudinal movement of the plunger; and valve actuating mechanism, comprising a direct controlling member wholly inclosed within said casing, and adapted to move the plunger axially, and an operating member projecting through the wall of said casing and having movement in a direction which is neutral with relation to the direction of differential pressure.

2. The combination of, a plunger valve whose extremities present substantially similar effective pressure areas, said plunger valve being provided with a longitudinal duct at the region of one extremity; a casing having an opening adapted to receive said plunger and permit longitudinal movement thereof, said casing comprising a chamber at one extremity of said opening and a passage-way at the other extremity of said opening, said chamber and said passage-way communicating independently of said opening, but completely inclosing the respective extremities of the valve; said casing also comprising a second passage-way communicating by a port with said opening at a region adapted to be controlled by longitudinal movement of the plunger; a lever completely inclosed within said chamber and operatively engaging said plunger; a shaft rigidly connected to said lever, and projecting through the wall of the casing, the axis of said shaft being substantially at right angles to the axis of the plunger; and means external to the casing for rocking said shaft.

3. The combination of a cylindrical plunger, whose extremities present substantially similar effective pressure areas, said plunger having a plurality of fluting at the region of one extremity; a casing having an opening adapted to receive said plunger and permit longitudinal movement thereof, said casing comprising an enlarged chamber, at one extremity of said opening, and a chamber and passage-way at the other extremity of said opening, said chambers communicating independently of said opening, but completely inclosing the respective extremities of the valve, said casing also comprising an intermediate chamber and passageway surrounding said opening and communicating therewith by a plurality of ports at a region adapted to be controlled by longitudinal movement of the plunger; a spring operatively engaging said plunger and normally tending to move it in the direction of opening the ports; a lever carrying a roller which bears axially upon one extremity of the plunger, said lever and roller being completely inclosed in said enlarged chamber; a shaft projecting through the wall of the casing and rigidly connected with said lever, and means external to the casting for rocking said shaft.

4. The combination of a plunger valve whose extremities present substantially similar effective pressure areas; a casing having an opening adapted to receive said plunger valve and permit longitudinal movement thereof, said casing comprising a chamber at each end of said opening, said chambers communicating independently of said opening, but inclosing the respective extremities of the valve; a passage way leading from said chambers, said casing also comprising a second passage way communicating by a port with said opening at a region adapted to be controlled by longitudinal movement of the plunger; a spring operatively engaging said plunger and normally tending to move it in the direction of opening said port; a valve actuating mechanism adapted to move the plunger in said opening.

5. The combination of a plunger valve whose extremities present substantially similar effective pressure areas; a casing having an opening adapted to receive said plunger valve and permit longitudinal movement thereof, said casing comprising a chamber at each end of said opening, said chambers communicating independently of said opening, but inclosing the respective extremities of the valve, a passage way leading from said chambers, said casing also comprising a second passage way communicating by a port with said opening at a region adapted to be controlled by longitudinal movement of the plunger; a spring operatively engaging said plunger and normally tending to move it in the direction of opening said port, said spring being completely inclosed in said casing; a valve actuating mechanism adapted to move the plunger in said opening.

6. The combination of a plunger valve whose extremities present substantially similar effective pressure areas; a casing having an opening adapted to receive said plunger valve and permit longitudinal movement thereof, said casing comprising a chamber at each end of said opening, said chambers communicating independently of said opening, but inclosing the respective extremities of the valve, a passage way leading from said chambers, said casing also comprising a second passageway communicating by a port with said opening at a region adapted to be controlled by longitudinal movement of the plunger; a spring operatively engaging said plunger and normally tending to move it in the direction of opening said port; a valve actuating mechanism comprising a direct controlling member wholly inclosed within said casing and adapted to move the plunger axially, and an operating member projecting through the wall of said casing and having movement in a direction which is neutral with relation to the direction of differential pressure.

7. The combination of a plunger valve whose extremities present substantially similar effective pressure areas; a casing having an opening adapted to receive said plunger valve and permit longitudinal movement thereof, said casing comprising a chamber at each end of said opening, said chambers communicating independently of said opening, but inclosing the respective extremities of the valve, a passage way leading from said chambers; said casing also comprising a second passage way communicating by a port with said opening at a region adapted to be controlled by longitudinal movement of the plunger; a spring operatively engaging said plunger and normally tending to move it in the direction of opening said port, said spring being completely inclosed in said casing; a valve actuating mechanism comprising a direct controlling member wholly inclosed within said casing and adapted to move the plunger axially, and an operating member projecting through the wall of said casing and having movement in a direction which is neutral with relation to the direction of differential pressure.

8. The combination of a plunger valve whose extremities present substantially similar effective pressure areas; a casing having an opening adapted to receive said plunger valve and permit longitudinal movement thereof, said casing comprising a chamber at each end of said opening, said chambers communicating independently of said opening, but inclosing the respective extremities of the valve, a passage way communicating with said chambers; said casing also comprising a second passage way communicating by a port with said opening at a region adapted to be controlled by longitudinal movement of the plunger; a spring operatively engaging said plunger and normally tending to move it in the direction of opening said port, said spring being completely inclosed in said casing; a lever completely inclosed within said chamber; a shaft rigidly connected to said lever and projecting through the wall of the casing, the axis of said shaft being substantially at right angles to the axis of the plunger, and means external to the casing for rocking said shaft.

9. The combination of a cylindrical plunger whose extremities present substantially similar effective pressure areas; a casing having an opening adapted to receive said plunger, and permit longitudinal movement thereof, said casing comprising an enlarged chamber at one extremity of said opening, and a chamber and passage way at the other extremity of said opening, said chambers communicating independently of said opening, but completely inclosing the respective extremities of the valve; said casing also comprising an intermediate chamber and passage way surrounding said opening, and communicating therewith by ports at a region adapted to be controlled by longitudinal movement of the plunger; a spring operatively engaging said plunger and normally tending to move it in the direction of opening the ports; a lever carrying a roller which bears axially upon one extremity of the plunger, said lever and roller being completely inclosed in said enlarged chamber; a shaft projecting through the walls of the casing and rigidly connected with said lever, and means external to the casing for rocking said shaft.

10. The combination of a cylindrical plunger whose extremities present substantially similar effective pressure areas; a casing having an opening adapted to receive said plunger, and permit longitudinal movement thereof, said casing comprising an enlarged chamber at one extremity of said opening, and a chamber and passage way at the other extremity of said opening, said chambers communicating independently of said opening, but completely inclosing the respective extremities of the valve; said casing also comprising an intermediate chamber and passage way surrounding said opening, and communicating therewith by ports at a region adapted to be controlled by longitudinal movement of the plunger; a spring operatively engaging said plunger and normally tending to move it in the direction of opening the ports, said spring being wholly inclosed within said casing; a lever carrying a roller which bears axially upon one extremity of the plunger, said lever and roller being completely inclosed in said enlarged chamber; a shaft projecting through the wall of the casing and rigidly connected with said lever, and means external to the casing for rocking said shaft.

11. The combination of, a plunger valve whose extremities present substantially similar effective pressure areas; a casing having an opening adapted to receive said plunger and permit longitudinal movement thereof, said casing comprising a chamber at one extremity of said opening and a passageway at the other extremity of said opening, said chamber and said passageway communicating independently of said opening, but completely inclosing the respective extremities of the valve; said casing also comprising a second passageway communicating by ports with said opening, a spring operatively engaging said plunger and normally tending to move it in the direction of maximum opening between the said passageways, a valve actuating mechanism adapted to move the plunger in said opening.

12. The combination of, a plunger valve whose extremities present pressure areas that are substantially alike as to effect; a casing having an opening adapted to receive said plunger valve and permit longitudinal movement thereof, said casing comprising a pressure chamber which comprises two portions which inclose the respective extremities of said plunger valve and a passageway connecting portions; a second passageway communicating by ports with said opening, a spring operatively engaging said plunger and normally tending to move it in the direction of maximum opening between the pressure chamber and the second passageway, said spring being completely inclosed in said casing, a valve actuating mechanism adapted to move the plunger in said opening.

Signed at Anderson, in the county of Madison and State of Indiana this 7th day of October, 1914.

LEWIS A DARLING.

Witnesses:
F. P. McDermott, Jr.,
John A. Vaneman.